(12) United States Patent
Lin et al.

(10) Patent No.: US 8,718,385 B2
(45) Date of Patent: May 6, 2014

(54) SIDING IDENTIFICATION SYSTEMS AND METHODS

(75) Inventors: Kai-Hsiang Lin, Urbana, IL (US); Rosemarie Geier Grant, Ellsworth, IL (US); Joshua M. Mast, Bloomington, IL (US); Douglas L. Dewey, Bloomington, IL (US); Charlie K. Dagli, Burlington, MA (US)

(73) Assignee: State Farm Mutual Automobile Insurance Company, Bloomington, IN (US)

( * ) Notice: Subject to any disclaimer, the term of this patent is extended or adjusted under 35 U.S.C. 154(b) by 0 days.

(21) Appl. No.: 13/555,486

(22) Filed: Jul. 23, 2012

(65) Prior Publication Data

US 2014/0023280 A1    Jan. 23, 2014

(51) Int. Cl.
  *G06K 9/68*    (2006.01)
  *G06K 9/66*    (2006.01)
  *G06F 7/00*    (2006.01)

(52) U.S. Cl.
  USPC ............................ 382/218; 382/195; 707/713

(58) Field of Classification Search
  USPC ................... 382/218, 195; 707/713
  See application file for complete search history.

(56) References Cited

U.S. PATENT DOCUMENTS

| | | | |
|---|---|---|---|
| 6,100,537 A * | 8/2000 | Abraham et al. | 250/559.22 |
| 6,226,391 B1 * | 5/2001 | Dydyk et al. | 382/125 |
| 6,230,552 B1 * | 5/2001 | Abe et al. | 73/104 |
| 6,275,821 B1 * | 8/2001 | Danish et al. | 1/1 |
| 6,549,660 B1 * | 4/2003 | Lipson et al. | 382/224 |
| 7,080,080 B1 * | 7/2006 | Miller | 1/1 |
| 7,120,280 B2 * | 10/2006 | Biswas et al. | 382/124 |
| 2003/0190061 A1 * | 10/2003 | Chou et al. | 382/124 |
| 2005/0021285 A1 * | 1/2005 | Troxler et al. | 702/156 |
| 2005/0069179 A1 * | 3/2005 | Hwang et al. | 382/124 |
| 2006/0008126 A1 * | 1/2006 | Holloran et al. | 382/124 |
| 2006/0133650 A1 * | 6/2006 | Xie et al. | 382/108 |
| 2007/0133866 A1 * | 6/2007 | Chang et al. | 382/159 |
| 2008/0069408 A1 * | 3/2008 | Cervantes | 382/115 |
| 2008/0118160 A1 * | 5/2008 | Fan et al. | 382/225 |
| 2008/0249738 A1 * | 10/2008 | Troxler | 702/156 |
| 2009/0060340 A1 * | 3/2009 | Zhou | 382/190 |
| 2010/0142825 A1 * | 6/2010 | Maxwell et al. | 382/199 |
| 2010/0150407 A1 * | 6/2010 | Cheswick | 382/118 |
| 2011/0064303 A1 * | 3/2011 | Winn et al. | 382/159 |
| 2011/0243450 A1 * | 10/2011 | Liu | 382/190 |
| 2012/0188418 A1 * | 7/2012 | Bosco et al. | 348/241 |
| 2013/0108179 A1 * | 5/2013 | Marchesotti et al. | 382/224 |

* cited by examiner

*Primary Examiner* — Kathleen Y Dulaney
(74) *Attorney, Agent, or Firm* — King & Spalding L.L.P.

(57) ABSTRACT

A method for identifying siding includes receiving particular texture data associated with a physical texture of a particular siding sample, accessing a reference database including reference texture data associated with physical texture of multiple different reference siding samples, performing an automated texture data analysis by analyzing the particular texture data associated with the particular siding sample and the reference texture data associated with different reference siding samples, and automatically identifying at least one reference siding sample that matches the particular siding sample based at least on the automated texture data analysis. The particular texture data associated with the physical texture of the particular siding sample may comprise a digital image, such as a photographic or scanned image of the particular siding sample, or a photographic or scanned image of an ink image physically transferred from the particular siding sample onto a substrate.

17 Claims, 8 Drawing Sheets

SIDING IDENTIFICATION SYSTEMS AND METHODS

TECHNICAL FIELD

The present disclosure relates generally to systems and methods for identifying siding, e.g., for use by a builder, contractor, or insurance company, for example.

BACKGROUND

Difficulties associated with identifying exterior siding (e.g., on a home or other building) has been a longstanding issue in the insurance industry, often leading to repair delays and/or unnecessary expenses. For example, if damaged siding on a home is misidentified the replacement siding ordered for the repair job—and in some cases, actually installed on the home—may not match the existing siding (e.g., in pattern, texture, color, etc.) to the satisfaction of the homeowner. As a result, the contractor may need to return the replacement siding (or if already installed, remove the replacement siding from the home), reattempt to identify the damaged siding, and order and install a new type of replacement siding, thus leading to project delays and lost revenues. If the product cannot be identified, all of the siding may have to be replaced, even if it is undamaged.

The process for identifying siding is often a laborious manual process. An insurance claim representative or adjuster typically visits the building having the damaged siding and obtains a physical sample of the siding, e.g., by removing a section of siding from the building itself, or by locating an uninstalled sample of the siding stored at the building. The personnel of the insurance company, may then visually compare the physical sample to various different types of physical samples or photographs of siding samples (e.g., from a variety of manufacturers) to locate siding that is visually similar to the siding to be replaced (e.g., a best available product). Alternatively, the claim representative or adjuster may take a photograph of the siding to be replaced, and then compare the photograph with various different physical samples or photographs of physical samples to identify a visual match. The claim representative or adjuster may also write down various attributes of the siding to be replaced, such as the material, style (e.g., Dutch lap, clapboard, etc.), face size, profile, and manufacturer (if known), in order to narrow the manual identification process.

The manual identification process can be very time-intensive, depending on the inventory of different samples or sample photographs available for comparison with the siding to be replaced. Further, it is inconvenient to manually search through hundreds of physical samples to identify the siding to be replaced.

SUMMARY

In accordance with the teachings of the present disclosure, disadvantages and problems associated with existing systems and methods for identifying siding have been reduced.

According to one aspect of certain embodiments, a method for identifying siding is provided. The method may include receiving particular texture data associated with a physical texture of a particular siding sample, accessing a reference database including reference texture data associated with physical texture of multiple different reference siding samples, performing an automated texture data analysis by analyzing the particular texture data associated with the particular siding sample and the reference texture data associated with different reference siding samples, and automatically identifying at least one reference siding sample that matches or is substantially similar to the particular siding sample based at least on the automated texture data analysis. The particular texture data associated with the physical texture of the particular siding sample may comprise a digital image, such as a photographic, scanned image, or other digitally captured data of the particular siding sample, or a digitized (e.g., photographed or scanned) version of a transferred ink image (e.g., an ink image physically transferred from the particular siding sample onto a substrate).

According to another aspect of certain embodiments, a method for identifying siding may include generating a transferred ink image of a siding sample by applying ink to the siding sample and applying an image substrate to the inked siding sample to transfer the ink from the siding sample to the image substrate, digitizing the transferred ink image, performing an automated analysis of the digitized transferred ink image, and automatically identifying from a plurality of reference siding samples at least one reference siding sample that matches the siding sample based at least on the analysis of the digitized transferred ink image.

According to another aspect of certain embodiments, a system for identifying siding includes a processor, a non-transitory storage medium, a display device, and a set of computer readable instructions stored in the non-transitory storage medium. The processor is programmed to execute the computer readable instructions to receive particular texture data associated with a physical texture of a particular siding sample; access a reference database including, for each of multiple different reference siding samples, reference texture data associated with a physical texture of that reference siding sample; perform an automated texture data analysis by analyzing the particular texture data associated with the particular siding sample and the reference texture data associated with different reference siding samples; based at least on the automated texture data analysis, identify at least one of the reference siding samples as a matching reference siding sample that matches the particular siding sample; and cause an indication of the at least one matching reference siding samples to be displayed on the display device.

According to another aspect of certain embodiments, a system for identifying siding includes a digital image generating device and a siding analysis engine. The digital image generating device may be programmed to digitize a transferred ink image of a particular siding sample, the transferred ink image being generated by applying ink to the particular siding sample and applying an image substrate to the inked siding sample to transfer the ink from the siding sample to the image substrate. The siding analysis engine may include a processor and a set of computer readable instructions stored in non-transitory storage media and executable by the processor to: perform an automated analysis of the digitized transferred ink image, and identify from a plurality of reference siding samples at least one reference siding sample that matches the siding sample based at least on the analysis of the digitized transferred ink image.

The systems and methods for identifying siding as disclosed herein may be used in any suitable application. For example, a builder, contractor, or insurance company may use such systems and methods to replace damaged or missing siding on a portions of a structure, to identify a similar product that would be used on an addition to an existing structure so as to ensure consistency of appearance, to infill areas when remodeling creates differences in door and window sizes, to identify similar products that would be used for a new acces-

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Preferred embodiments and their advantages over the prior art are best understood by reference to FIGS. 1-12B below. However, the present disclosure may be more easily understood in the context of a high level description of certain embodiments.

Figure 1:
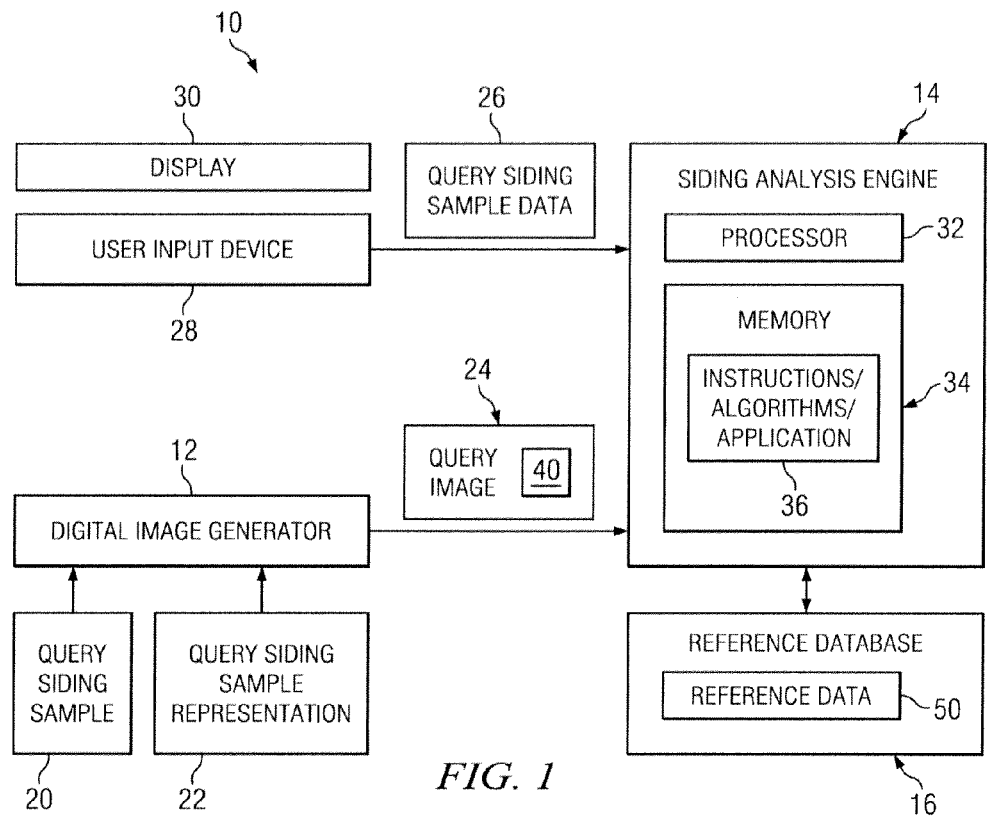
FIG. 1 illustrates an example siding identification system configured to identify one or more visually similar products to an unknown siding sample, according to an example embodiment.

FIG. 1 illustrates an example siding identification system 10, according to certain embodiments. In general, siding identification system 10 may be operable to identify one or more substantially similar products for an unknown siding sample, e.g., a sample of siding to be replaced on a building having old or damaged siding.

As shown, siding identification system 10 may include a digital image generator 12, a siding analysis engine 14, and a reference database 16, a user input device 28, and a display device 30.

Digital image generator 12 may comprise any system or device configured to generate one or more digital images 24 of a siding sample 20 or a siding sample representation 22. As used herein, "digital images" may include image data or other digital data representative of the physical surface and/or appearance of a siding sample or siding sample representation. For example, digital image generator 12 may be configured to generate a digital photographic image, a digital scanned image, or other digital data representative of a siding sample 20 and/or a siding sample representation 22. Thus, digital image generator 12 may be, for example, (a) a digital camera (e.g., a stand-alone camera or a camera incorporated in another device, such as a smart phone or personal digital assistant, for example), (b) a scanner (e.g., a flatbed scanner, photo scanner, sheet-fed scanner, portable handheld scanner, or a scanner incorporated in another device, such as a smart phone or personal digital assistant, for example), (c) a Light Detection and Ranging (LIDAR) system or device, (d) a digital elevation modeling (DEM) system or device, (e) a quality control surface inspection system or device, or any other device configured to generate digital data or images. As used herein, the term "siding sample" refers to any physical item of siding, or any portion thereof, e.g., a board, shingle, or sheet of siding, or any portion thereof. A siding sample may be formed of any suitable type of material, e.g., vinyl, HardiPlank™, metal, or composite materials.

A "siding sample representation" is any tangible representation of a siding sample. Examples of siding sample representations include (a) a transferred ink image (e.g., an ink rubbing) of a siding sample (discussed below), and (b) a tangible image of a siding sample, e.g., a printed photographic or printed image of a siding sample.

Each digital image 24 of a siding sample 20 or a siding sample representation 22 of a siding sample 20 may include data regarding the physical texture of the siding sample 20. For example, the digital image 24 may indicate textural features such as grooves, recesses, protrusions, or other dimensional features that simulate wood grain, for example.

Siding analysis engine 14 is configured to analyze data regarding a particular siding sample, referred to as a "query siding sample," to identify or attempt to identify the type of the query siding sample. For example, in some embodiments, siding analysis engine 14 may receive (a) one or more digital imaged 24 of the query siding sample (i.e., a "query image") received from digital image generator 12 and/or (b) additional siding characteristic data 26 regarding the query siding sample, access reference data 50 from reference database 16, and compare the digital image(s) 24 and/or additional siding characteristic data 26 regarding the query siding sample with reference data 50 regarding a number of reference siding samples 52 to identify one or more reference siding samples 52 that "match" the query siding sample, referred to herein as "matching" siding samples. Thus, for example, a matching siding sample may be selected for replacing a damaged section of siding corresponding to the query siding sample.

As used herein, siding samples "match" if they are visually identical or substantially similar. In some embodiments, siding samples are "substantially similar" if a quantitative measure of similarly resulting from a pattern recognition analysis of the siding samples (e.g., the "similarity score" discussed below) exceeds a predefined threshold. For example, in one embodiment, each reference siding sample having a similarity score of about 70 with respect to a query siding sample is considered substantially similar to the query siding sample, and thus a "matching" siding sample. In other embodiments, "substantially similar" may be defined as the "n" most visually similar siding samples with respect to a particular siding sample (e.g., query sample), as determined by a fully or partially automated pattern recognition analysis, where n is any predefined number (e.g., 3, 4, 5, 6, 8, 10, etc.). For example, in an embodiment in which siding analysis engine 14 displays the five most similar references siding samples to a query siding sample (e.g., the five references siding samples having the highest similarity score with respect to the query siding sample), such five references siding samples are considered substantially similar to the query sample, and thus "matching" siding samples. In other embodiments, substantial similarity may be defined in any other suitable manner.

Additional siding characteristic data 26 may include texture-related data and non-texture-related data regarding the query siding sample. For example, additional siding characteristic data 26 may include any or all of the following categories of data: (a) Material, (b) Style, (c) Face Size, (d) Profile, (e) Manufacturer, (f) Butt Size, (g) Thickness, (h) Weep Hole Shapes, (i) Nail Hem Shapes, (j) Water Marks, (k) Knot Designs, (l) Color, and/or any other categories. Each of these example categories is discussed in detail below with reference to FIG. 2.

Additional siding characteristic data 26 may be accessed by siding analysis engine 14 from any suitable source in any suitable manner. For example, siding characteristic data 26 may be manually input by a user at user input device 28, automatically accessed from user input device 28 or other data source, or some combination of the two (e.g., in response to receiving particular siding characteristic data 26 input by a user, siding analysis engine 14 may automatically access further siding characteristic data 26 from user input device 28 or other data source based on the data input by the user).

As shown in FIG. 1, siding analysis engine 14 may include a processor 32 configured to execute instructions 36 stored in memory 34 for providing any of the various functionality of siding analysis engine 14. Processor 32 may include a microprocessor, a microcontroller, a digital signal processor (DSP), an application specific integrated controller (ASIC), electrically-programmable read-only memory (EPROM), or a field-programmable gate array (FPGA), or any other suitable processor(s), and may be generally operable to execute instructions 36 stored in memory 34. Instructions 36 may include any form of computer-readable instructions or code, e.g., one or more algorithms or applications. In some embodiments, instructions 36 include a siding analysis application configured to analyze query siding samples and provide user interaction with engine 14.

In some embodiments, siding analysis engine 14, user input device 28, and display 30 are communicatively coupled such that siding analysis engine 14 (e.g., a siding analysis application 36) displays data on display 30, which may include user interface screens allowing a user to interact with siding analysis engine 14 via user input device 28, e.g., to enter query siding sample data 26, select other search parameters, view search results from engine 14, etc. Example screen shots generated by siding analysis application 36 for allowing a user to interface with engine 14 via user input device 28 are provided in FIGS. 4 and 8, which are discussed below.

Memory 34 may store executable instructions 36 (e.g., algorithms 38) related to the operation of siding analysis engine 14. Memory 34 may comprise any one or more devices suitable for storing electronic data, e.g., RAM, DRAM, ROM, internal flash memory, external flash memory cards (e.g., Multi Media Card (MMC), Reduced-Size MMC (RS-MMC), Secure Digital (SD), MiniSD, MicroSD, Compact Flash, Ultra Compact Flash, Sony Memory Stick, etc.), SIM memory, and/or any other type of volatile or non-volatile memory or storage device. Instructions 36 may be embodied in any combination of software, firmware, and/or any other type of computer-readable instructions. For example, instructions 36 may be embodied in the form of an application and/or any suitable plug-ins, readers, viewers, updates, patches, or other code, which may be downloaded via the Internet or installed on the relevant computer device in any other known manner.

User input device 28 may comprise any device configured to receive instructions and/or input from a user related to siding identification system 10. For example, user input device 28 may provide a user interface for controlling the operation of siding analysis engine 14 and/or for entering data relevant to operation of siding analysis engine 14 or other components of siding identification system 10, e.g., siding characteristic data 26 regarding a particular query image. User input device 28 may include any suitable user interfaces, e.g., touch screen, keyboard, mouse, physical buttons, or any other suitable devices.

Display 30 may comprise any type of display device for displaying information related to siding identification system 10, such as for example, a monitor, LCD screen, or any other suitable type of display. In some embodiments, display 30 may be an interactive display (e.g., a touch screen) that allows a user to interact with siding identification system 10. In other embodiments, display 30 may be strictly a display device, such that all user input is received via user input device 28.

Reference database 16 may comprise any suitable database for storing reference data 50, and may be stored in any suitable memory device on any suitable computer (e.g., server, desktop computer, laptop computer, tablet-style computer, smartphone. PDA, etc.). In some embodiments reference database 16 may be stored in memory 34, while in other embodiments reference database 16 may be stored separately and/or remotely from siding analysis engine 14.

As discussed in greater detail below with reference to FIG. 2, reference data 50 stored in reference database 16 may include various data related to any number of different reference siding samples 52. Siding analysis engine 14 may compare one or more query image(s) 24 and/or additional siding characteristic data 26 for an unknown siding sample with such reference data 50 to identify one or more reference siding samples 52 that match the unknown siding sample, in order to identify the unknown siding sample.

Depending on the particular embodiment, any or all of digital image generator 12, siding analysis engine 14, reference database 16, user input device 28, and display 30 may be integral with each other, or may be distinct from each other, in any suitable combination. For example, in some embodiments, all of digital image generator 12, siding analysis engine 14, reference database 16, user input device 28, and display 30 may be integrated in a single device, e.g., desktop computer, laptop computer, tablet-style computer, smartphone, personal digital assistant (PDA), or any other suitable electronics device.

In other embodiments, digital image generator 12, siding analysis engine 14, reference database 16, user input device 28, and display 30 may all be separate devices, some or all of which may be connected by a network or other suitable communication links.

In other embodiments, siding analysis engine 14, reference database 16, user input device 28, and display 30 may be integrated in a single device (e.g., desktop computer, laptop computer, tablet-style computer, smartphone, PDA, or any other suitable electronics device), while digital image generator 12 is a separate device (e.g., a scanner, camera, or other image generator, e.g., provided as a stand-alone-device or provided by a laptop, smartphone, or PDA, for example). For example, a user may carry digital image generator 12 (e.g., in the form of a scanner, laptop, or smartphone) to a location of a siding sample 20 to be identified, use digital image generator 12 to generate a digital image 24 of the siding sample 20 and/or of a siding sample representation 22 (e.g., a transferred ink image) of the siding sample 20, of a siding sample of the siding, and then communicate or transfer the digital image 24 to siding analysis engine 14 (e.g., via any suitable communications links using any suitable communications protocols, or by physically transferring the digital image 24 using a USB drive, or in any other suitable manner).

In other embodiments, digital image generator 12 and user input device 28 may be integrated in a first device (e.g., desktop computer, laptop computer, tablet-style computer, smartphone, PDA, or any other suitable electronics device), while siding analysis engine 14, reference database 16, and display 30 are integrated in a second device (e.g., desktop computer, laptop computer, tablet-style computer, smartphone, PDA, or any other suitable electronics device). Alternatively, reference database 16 may be provided by a third device, separate and/or remote from siding analysis engine 14.

In other embodiments, digital image generator 12, user input device 28, and device 30 may be integrated in a first device (e.g., desktop computer, laptop computer, tablet-style computer, smartphone, PDA, or any other suitable electronics device), while siding analysis engine 14 and reference database 16 are integrated in a second device (e.g., desktop computer, laptop computer, tablet-style computer, smartphone, PDA, or any other suitable electronics device).

In other embodiments, digital image generator 12, user input device 28, siding analysis engine 14, and device 30 may be integrated in a first device (e.g., desktop computer, laptop computer, tablet-style computer, smartphone, PDA, or any other suitable electronics device), while reference database 16 is provided in a separate second device (e.g., in a separate server or other computer) remote from the first device. In such embodiments, the first device may communicate with the second device via any suitable communications links using any suitable communications protocols, e.g., to allow siding analysis engine 14 to access reference data 50 for analyzing a query image 24.

Other embodiments may include any other suitable configuration of siding identification system 10.

Figure 2:
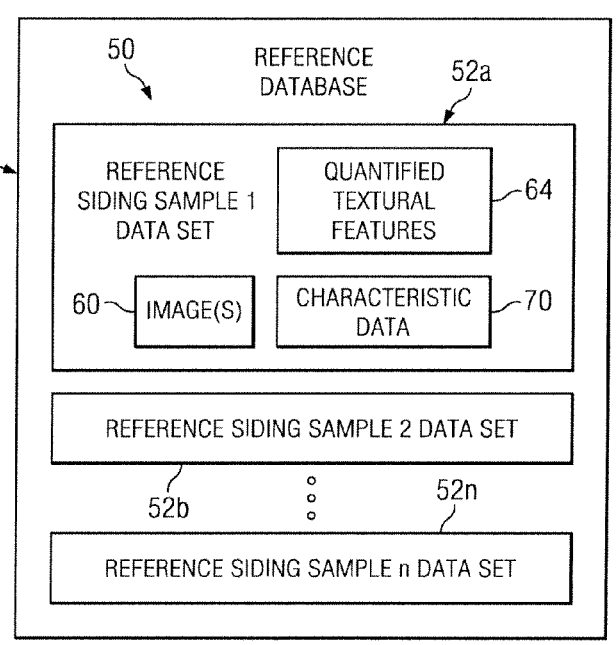
FIG. 2 illustrates an example database storing reference data regarding reference siding samples, according to an example embodiment.

FIG. 2 illustrates an example reference database 16 storing reference data 50 according to certain embodiments. Reference data 50 may include a number of reference siding sample data sets 52 (indicated as data sets 52a, 52b ... 52n), each corresponding to a different reference siding sample. Such data may be accessed and used by siding analysis engine 14 for identifying or finding a similar product to the unknown siding sample. In the illustrated example, each reference siding sample data set 52 may include one or more images 60, quantified visual features 64, and/or additional characteristic data 70. Image(s) 60 may comprise one or more digital images of a siding sample or siding sample representation, e.g., a single images of a siding sample/siding sample representation, or multiple images of different portions of a siding sample/siding sample representation to capture different textural patterns at different locations of the siding sample.

Quantified visual features 64 may include any features and/or feature characteristic that may be extracted and/or analyzed from a siding image 60 using any suitable image processing or pattern recognition algorithms, functions, applications, or systems (e.g., as embodied in instructions 36). As examples only, quantified visual features 64 may include image features, e.g., edges, corners, blobs, ridges, lines, curves, shapes, contours, objects, areas, etc. of a siding image 60 and/or characteristics of such features, e.g., quantity, shape, size, length, width, curvature, direction, orientation, clarity, color, distance between features, feature density, feature clustering, feature distribution, etc., and/or statistical distributions of any such features, that may be extracted and/or analyzed from the siding image using any suitable feature extraction tools or techniques, e.g., Gabor filters, local binary patterns (LBP), histogram of oriented gradients (HOG), etc. Similar to Gabor filters, LBP and HOG both reflect some statistical visual property or properties of the texture image 60.

Additional characteristic data 70 may include any data regarding any characteristics that may be useful in identifying a siding sample. In this illustrated example, characteristic data 70 may include the following categories of data:

(a) Material.

The "material" classification may identify the material of the siding sample. Example "material" classifications may include: aluminum (solid color), aluminum (variegated), composite, concrete fiber (asbestos), fiber cement, fiberglass, pressed board (Masonite), steel (solid color), steel (variegated color), vinyl (solid color), vinyl (variegated color), wood, etc.

(b) Style.

Example "style" classifications may include: asbestos replacement, board and batten, clapboard, double beaded, dutchlap, full bead, half bead, half rounds, logs, masonry, panel, shakes, soffit—beaded, soffit—flat panels, soffit—U groove soffit, soffit—V groove soffit, vertical, etc.

(c) Face Size.

Example "face size" classifications may include: 1", 1½", 1¹¹⁄₁₆", 1¾", 2", 2⅛", 2¼", 2⅝", 2⅔, 2¾", 2⅞", 3", 3⅛, 3¼", 3⅓", etc.

(d) Profile.

Example "profile" classifications may include: D14", D3½", D3¾", D3⅝", D4¼", D4¾", D4", D5⅛", ... D9", Flat shingle, Q2¼", etc. "Profile" is the industry nomenclature for the contour that is formed that shapes the siding and gives it its distinctive look. Various profile classifications may be found in manufacturers' literature that describes their respective products. Some examples are found at http://www.progressivefoam.com/types-of-vinyl-siding, http://imgs.ebuild.com/xCat/ebuildWebB/15?ObjectID=25801&Variant=Original, and http://www.dixiehomecrafters.com/blog/types-of-vinyl-siding-horizontal-and-vertical-profiles.

(e) Manufacturer.

Example "manufacturer" classifications may include: Alcan, Alcoa Home Exteriors, Allis Chalmers, Alside, Amcraft Building Products, Ashland Davis, Bird Vinyl Products, etc.

(f) Butt Size.

The "butt size" classification is a measure of how far the bottom of the siding projects from the exterior wall plane. Example "butt size" classifications may include: ¼", ⅜", ½", ⅝", ¾", ⅞", 1", 1⅛", 1¼", etc.

(g) Thickness.

The "thickness" classification is a measure of the physical thickness of the siding. For example, for vinyl siding, the "thickness" classifications may range from 0.038" to 0.48" in increments of 0.02" Appropriate "thickness" classifications may similarly be provided for other types of siding, e.g., steel and aluminum siding.

(h) Weep Hole Shapes.

Weep holes are an integral aspect of certain types of siding (e.g., certain vinyl siding) that provides a path for moisture to escape from behind the exterior cladding. The weep holes are typically located on the bottom of the vinyl siding. Some manufacturers have developed weep holes in unique shapes. Thus, siding samples that include weep holes may be assigned to a predetermined weep hole shape. Example "weep hole shape" classifications may include "triangular with straight edges," "triangular with curved edges," "square," "non-square rectangular," "oval," "T-shaped," etc. Further, "weep hole shape" classifications may include a size factor.

In addition, or alternatively, characteristic data 70 may include may include one or more stored images that represent each weep hole shape classification. These images or similar images may be displayed to a user entering characteristic data 26 for a query siding sample, to help the user identify the weep hole shape that corresponds to the query siding sample.

(i) Nail Hem Shapes.

Certain types of siding include a nail hem that provides an area for mechanically fastening a piece of siding to the wall and also locks the piece immediately above it. For some types of siding, the nail hem is produced with a distinctive design characteristic. Thus, certain types of siding can be classified according to the shape, design, and/or size of the nail hem.

In addition, or alternatively, characteristic data 70 may include may include one or more stored images that represent each nail hem shape classification. These images or similar images may be displayed to a user entering characteristic data 26 for a query siding sample, to help the user identify the nail hem shape that corresponds to the query siding sample.

(j) Water Marks.

Water marks are lines provided in certain types of siding, typically oriented generally vertically, e.g., at a right angle to the main texture of the siding. Thus, certain types of siding can be classified according to the shape, size, orientation, or other aspect of the water marks.

(k) Knot Designs.

Knot designs are areas provided in certain types of simulated wood siding (e.g., vinyl siding) that are designed in the shape of knots present in wood boards. Thus, certain types of siding can be classified according to the shape, size, orientation, or other aspect of the knot design.

(l) Color.

Certain types of siding are manufactured in specific colors. Thus, certain types of siding can be classified according to color. For example, color data for particular siding samples (e.g., corresponding to a particular product and manufacturer) may include a list of all possible colors for the respective siding sample, which data may be obtained from the manufacturer, a third party, or otherwise determined. In some embodiments, siding analysis engine 14 may be programmed to filter the possible matches for a query siding sample by comparing the color of the query siding sample with color data 70 of reference samples. For example, a color number for the query siding sample can be cross matched to the correct manufacturer, product name, and/or color. The color of the query siding sample may be determined in any suitable manner, e.g., by digital image generator 12, by a spectrophotometer, or in any other suitable manner.

(m) Other.

Characteristic data 70 may include any additional and/or different categories of data regarding each reference siding sample.

Some or all of the categories of characteristic data 70 for reference siding samples 52 may correspond to some or all of the categories of siding characteristic data 26 regarding the query sample to be identified, such that the reference sample characteristic data 70 and the query sample characteristic data 26 can be analyzed, e.g., to filter the potential matches of the query siding sample.

Figure 3:
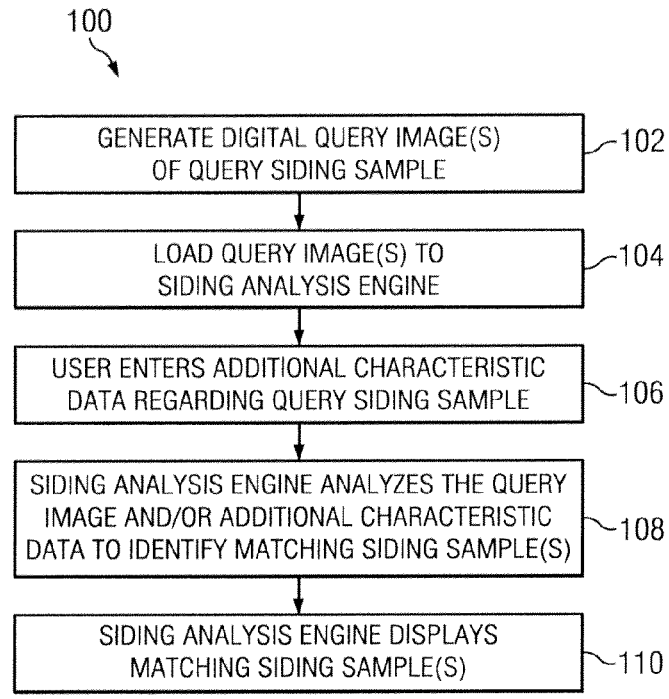
FIG. 3 is a flowchart illustrating a general method for analyzing a query siding sample using siding analysis engine, e.g., to identify the query siding sample, according to an example embodiment.

FIG. 3 is a flowchart illustrating a general method 100 for analyzing a query siding sample using siding analysis engine 14, e.g., to identify the query siding sample, according to an example embodiment.

At step 102, digital image generator 12 generates one or more digital query images 24 of a siding sample 20 or a siding sample representation 22, e.g., a photograph or a transferred ink image of a siding sample. At step 104, the query image 24 is loaded or communicated to siding analysis engine 14 or otherwise accessed by siding analysis engine 14, depending on the particular arrangement of system 10. In one example embodiment, digital image generator 12 generates a digital photograph of a siding sample 20 and also digitizes a transferred ink image of the siding sample 20, both of which are loaded to siding analysis engine 14.

At step 106, a user may enter additional characteristic data 26 regarding the query siding sample, e.g., via user input device 28. In some embodiments, a siding analysis application 36 may present one or more user interface screens to the user that provide the user a software-based interface for selecting or otherwise entering classifications for one or more categories of characteristic data 26 regarding the query siding sample, e.g., any of the example categories discussed above.

Figure 4:
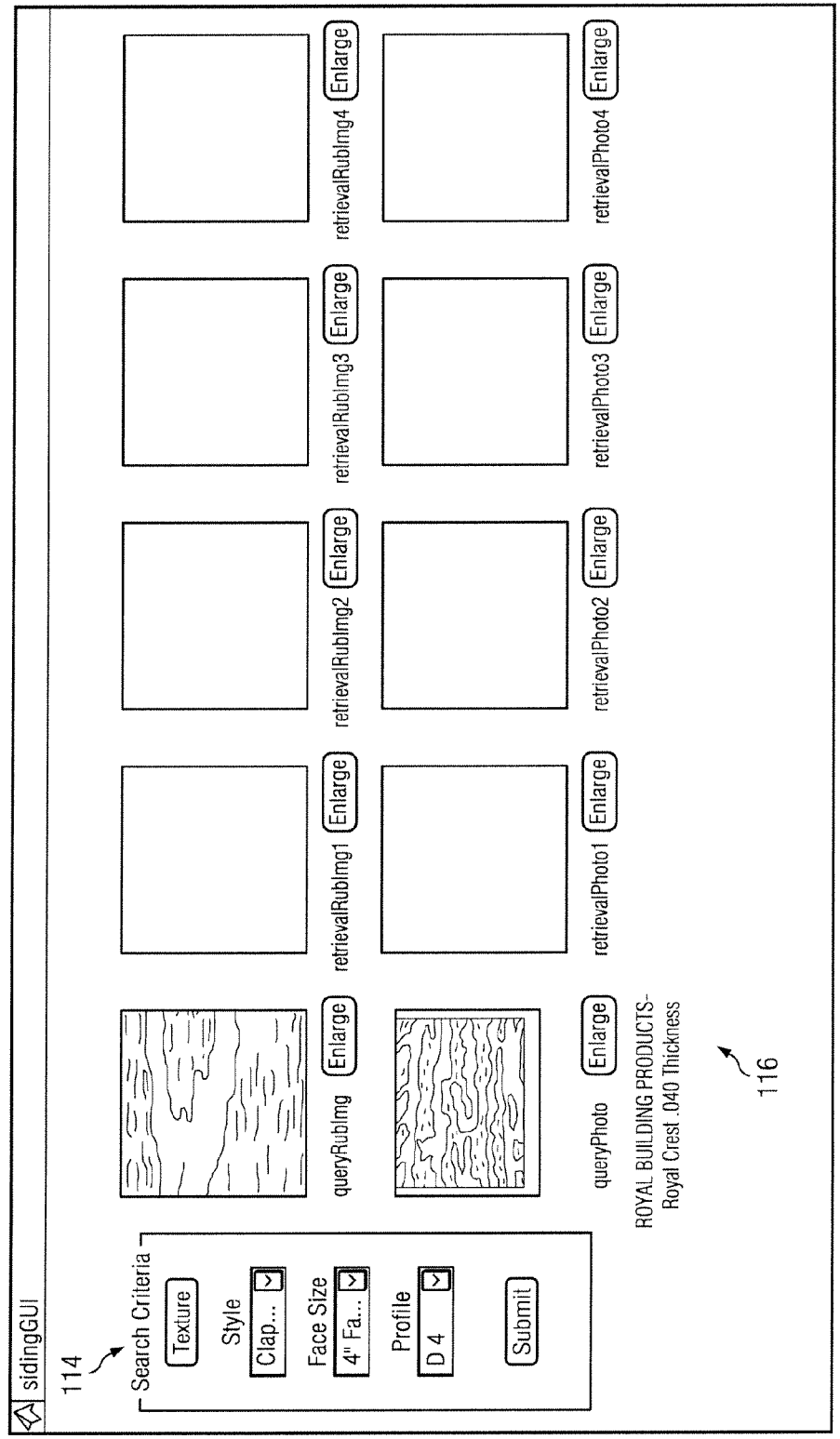
FIG. 4 illustrates an example screen shot generated by a siding analysis application of a siding analysis engine, which includes a characteristic data selection area and an analysis results area, according to an example embodiment.

FIG. 4 illustrates an example screen shot generated by a siding analysis application 36 of siding analysis engine 14, which includes a characteristic data selection area 114 and an analysis results area 116. Characteristic data selection area 114 includes various interfaces allowing the user to select one or more characteristic data classifications. In this example, characteristic data selection area 114 allows the user to classify the query sample for the following characteristic data categories: style, face size, and profile. Analysis results area 116 displays (a) for the query siding sample, a digitized transferred ink image of the query siding sample and a digital photographic image of the query siding sample that have been loaded to siding analysis engine 14 (e.g., from digital image generator 12) and (b) an area to display a digitized transferred ink image and a digital photographic image for each of the matching siding samples (arranged in order of similarity). In the illustrated example, the four best matches to the query siding sample (or fewer, if fewer than four matches are identified) may be displayed in the analysis results area 116 at a time, arranged in order from best match to least best match. In some embodiments, additional matching siding samples (if more than four matches are identified) may be viewed by scrolling or clicking an appropriate link provided in analysis results area 116.

At step 108, siding analysis engine 14 may analyze the query image 24 and (optional) additional characteristic data 26 to identify one or more matching siding samples based on the siding sample reference data 50 stored in reference database 16. After identifying one or more matching siding samples, siding analysis engine 14 may then display the matching siding sample(s) to the user in any suitable form at step 110, e.g., with textual descriptions of the respective manufacturer, product name, other reference data, etc. and/or images 60 of the matching siding sample(s). Siding analysis engine 14 may display the matching siding sample(s) in any suitable manner at step 132. For example, siding analysis engine 14 may display or identify the best match (e.g., the reference siding sample having the highest similarity score) or multiple matching siding samples in order of similarity (e.g., based on a determined similarity score for each sample). The similarity score is discussed below with reference to method 120 of FIG. 6.

Figure 5:
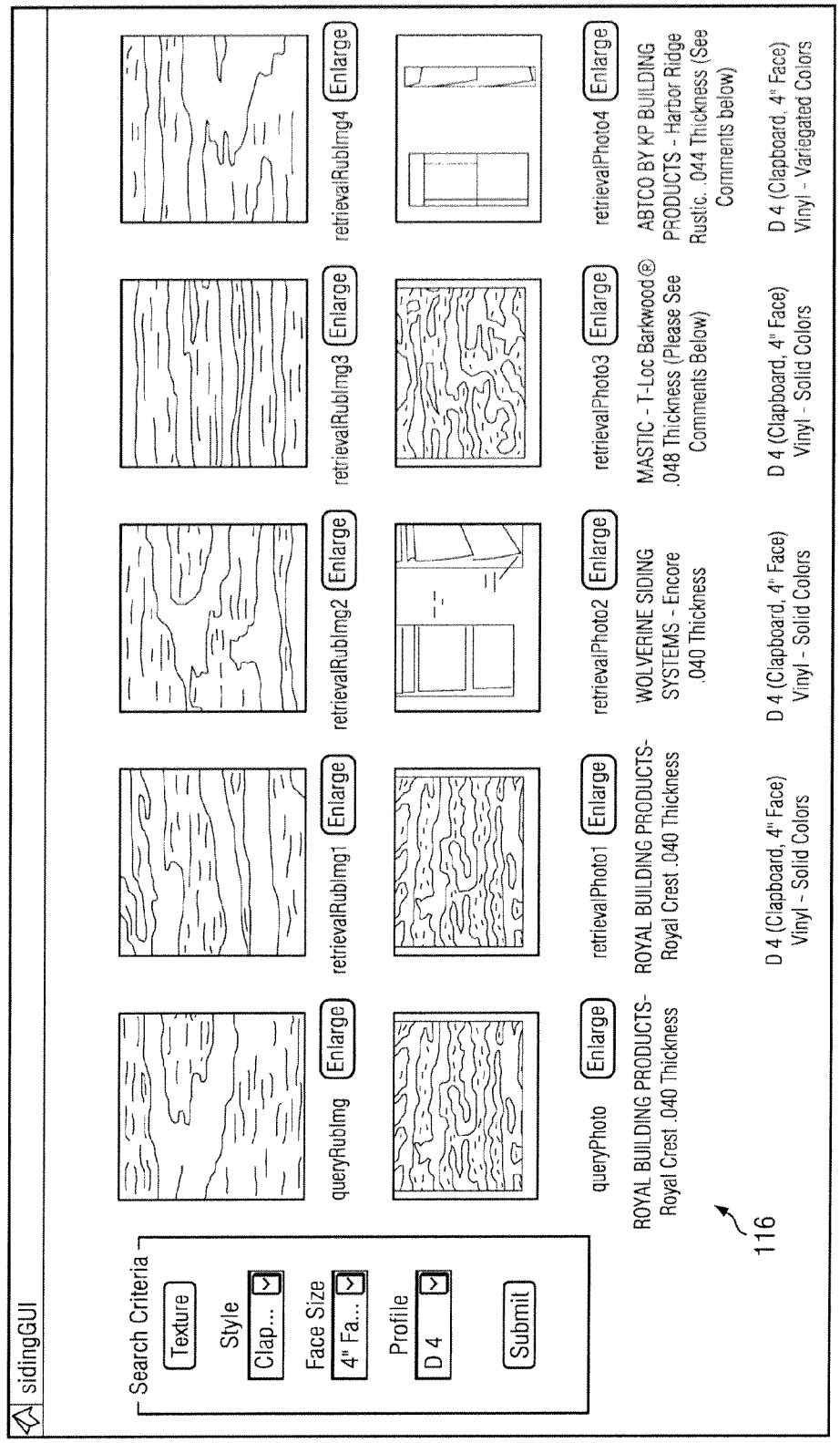
FIG. 5 illustrates an example screen shot corresponding to the screen shot of FIG. 4, in which the area for displaying visually similar siding samples has been populated, according to an example embodiment.

FIG. 5 illustrates an example screen shot corresponding to the screen shot of FIG. 4, in which the area for displaying the matching siding samples has been populated. In particular, for each of four different matching siding samples (arranged in order of similarity), a digitized transferred ink image 60a and a digital photographic image 60b of that matching siding sample (images 60a and 60b being accessed from database 16) are displayed in the analysis results area 116.

Figure 6:
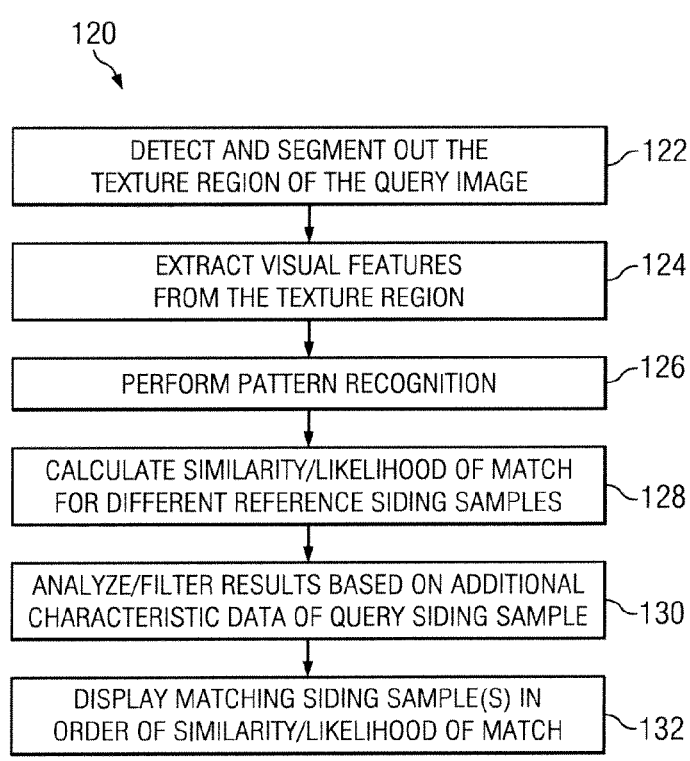
FIG. 6 is a flowchart illustrating an example method for analyzing a query image and/or additional characteristic data of a query siding sample to identify one or more visually similar siding samples, according to an example embodiment.

FIG. 6 is a flowchart illustrating one example method 120 for performing step 108 of method 100, i.e., analyzing a query image 24 and/or additional characteristic data 26 of a query siding sample to identify one or more matching siding samples, according to an example embodiment.

Figure 7:
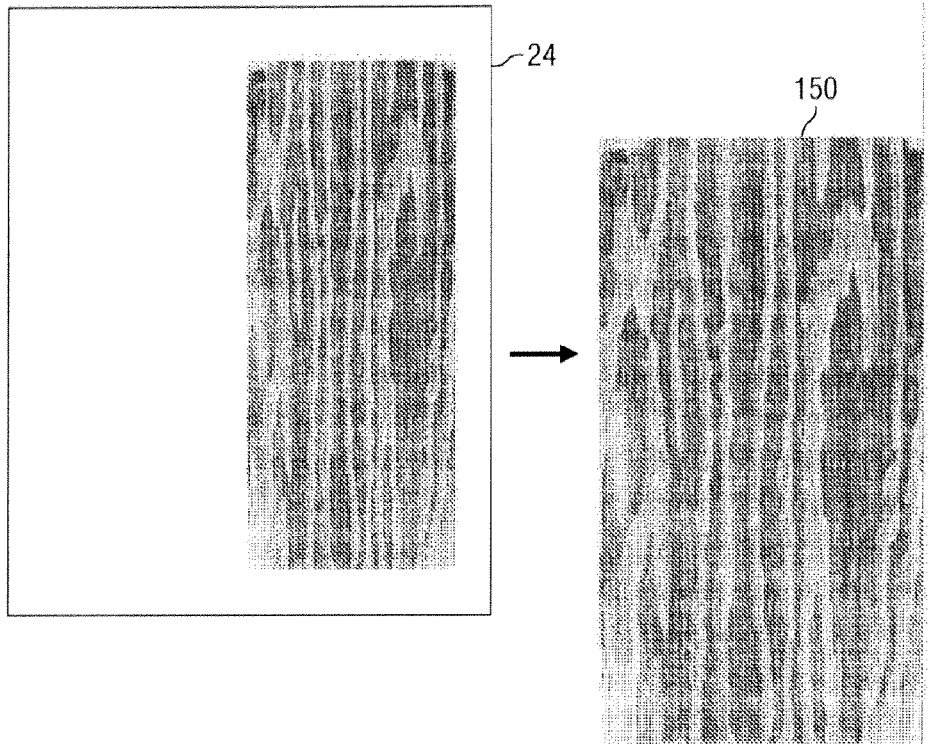
FIG. 7 illustrates the segmenting of a texture region from a query image, according to an example embodiment.

At step 122, siding analysis engine 14 detects and segments out a texture region 150 of the query image 24 for analysis. As shown in FIG. 7, the actual image of the siding sample, referred to as the texture region 150, may only cover a portion of the query image 24, and thus engine 14 may identify and isolate the texture region 150 from the query image 24 using any suitable detection and segmentation techniques.

At step 124, siding analysis engine 14 may extract quantified visual features 40 from texture region 150, or from each of a number of "patches" of the texture region 150. A "patch" is a small sub region of the image. For example, suppose texture region 150 is 512×128 pixels. Engine 14 may crop the texture region into 16 sub-regions, or "patches," of 64×64 pixels each. Patches may be generated in any suitable manner, e.g., using overlap or other suitable techniques.

In one embodiment, siding analysis engine 14 may use a set of Gabor filters with different frequencies and orientations to extract useful Gabor features from texture region 150 (or patches of region 150) of query image 24, e.g., extracting edges and edge properties such as edge frequencies and orientations, for example. The Gabor features may correspond to grain lines or other lines or contours of the siding sample. Engine 14 may extract the distances between the identified Gabor features (e.g., edges or lines), the orientation of the features, the thickness of the features (e.g., edge or line thickness), the average number of features per square inch, and/or any other suitable characteristic of the identified features. A visualization of an example Gabor feature extraction is illustrated at http://www.cs.utah.edu/~arul/report/node13.html (see, e.g., FIG. 6).

At step 126, siding analysis engine 14 may perform a pattern recognition technique to classify the query siding sample and/or identify potential matches for the query siding sample based on the visual features 40 extracted from texture region 150 (or from different patches of texture region 150) of the query image 24. In some embodiments, siding analysis engine 14 may analyze visual features 40 (e.g., Gabor features) extracted from query texture region 150 to identify potentially matching reference siding samples 52, based on quantified visual features 64 (e.g., Gabor features) extracted from reference siding sample images 60 stored in reference database 16. Thus, siding analysis engine 14 may compare the quantified visual features 40 extracted from each patch of the texture region 150 with the quantified visual features 64 extracted from reference images 60 stored in reference database 16 for different reference siding samples 52a-52n, using any suitable algorithms. This may include comparing the distribution (e.g., probability distribution) of identified visual features 40 extracted from the query texture region 150 with distributions (e.g., probability distributions) of visual features 64 in different reference siding sample data set 52a-52n to quantify the level of visual similarity between query image 24 and different individual reference siding samples.

Further, in some embodiments, siding analysis engine 14 may compare or analyze a particular type of query image 24 with reference to the same type of reference images 60 (e.g., engine 14 may compare or analyze quantified visual features 40 extracted from a particular type of query image 24 with quantified visual features 64 extracted from the same type of reference images 60). For example, siding analysis engine 14 may compare or analyze a digitized transferred ink image 24 of a query siding sample with reference to digitized transferred ink images 60a of reference siding sample. As another example, siding analysis engine 14 may compare or analyze a digital photographic image of a query siding sample with reference to digital photographic images 60b of reference siding samples.

In some embodiments, siding analysis engine 14 may compare or analyze a particular type of query image 24 with reference to one or more different types of reference images 60 (e.g., engine 14 may compare or analyze quantified visual features 40 extracted from a particular type of query image 24 with quantified visual features 64 extracted from the same type of reference images 60). For example, siding analysis engine 14 may compare or analyze a digitized transferred ink image 24 of a query siding sample with reference to both (a) digitized transferred ink images 60a of reference siding sample, and (b) digital photographic images 60b of the reference siding samples or other data sources.

At step 128, based on the analysis of visual features 40 and 64 at step 126, siding analysis engine 14 may calculate a level of similarity (e.g., similarity score) between query texture region 150 and different reference siding samples 52, using any suitable algorithms or techniques.

Siding analysis engine 14 may utilize any suitable pattern recognition algorithms or techniques for performing step 126 and/or step 128, e.g., a Gaussian Mixture Model (GMM), a support vector machine (SVM) model, a combination thereof (e.g., Gaussian kernel SVM), k-nearest neighbor (k-NN), Artificial Neural network, or any other suitable pattern recognition algorithms or techniques. For example, siding analysis engine 14 may use one or more of such pattern recognition algorithms or techniques to compare features 40 or statistical distributions of features 40 of the query image 24 with features 64 or statistical distributions of features 64 of various reference siding samples 52.

Siding analysis engine 14 may thereby perform a supervised pattern recognition analysis. Such pattern recognition methods include two steps: training and testing. In the training stage, siding analysis engine 14 may collect "training" samples 52 and extract features 64 from such samples. Then engine 14 may use pattern recognition techniques to learn a pattern recognition function based on the distribution of features 64 of the training data. In the testing step, engine 14 may use this function to estimate the likelihood of a query image 24 matching various reference samples by analyzing the distribution of features 40 extracted from the query image 24.

In embodiments in which different "patches" of the texture region 150 are evaluated individually, engine 14 may calculate a joint likelihood of matching between the multiple patches and different individual reference siding samples or different texture groups, using any suitable algorithms.

At step 130, siding analysis engine 14 may further analyze level of similarity between the query siding sample and reference siding samples based on additional characteristic data 26 regarding the query siding sample (e.g., as received at step 106 of method 100 discussed above), using any suitable algorithms. For example, engine 14 may compare additional characteristic data 26 regarding the query siding sample with characteristic data 70 in reference siding sample data sets 52a-52n to filter the potentially similar reference siding samples. In some embodiments, engine 14 may conclusively filter potentially similar reference siding samples based on the comparisons of one or more specified categories of characteristic data 40, 70, such that each reference siding sample that does not match the classification of the query sample (e.g., the particular material, style, face size, etc.) is excluded as a potential match. In other embodiments, engine 14 may consider the results of the comparisons between query sample characteristic data 40 and reference sample characteristic data 70, without conclusively filtering results based on such comparison results. For example, engine 14 may apply a suitable algorithm that factors such comparison results into the calculated level of similarity between a query sample and reference siding sample, without necessarily excluding the reference siding sample if one or more characteristic data classification do not match. Thus, engine 14 may for instance include an algorithm that process the comparison of visual features 40 and 64 and the comparison of characteristic data 40 and 70 as weighted factors to calculate an overall similarity score for each of a number of reference siding samples (as compared to the query siding sample).

After determining one or more siding samples that match the query siding sample, siding analysis engine 14 may output the one or more matching siding samples in any suitable manner at step 132. For example, siding analysis engine 14 may display or identify the best match (e.g., the reference siding sample having the highest similarity score) or multiple matching siding samples in order of similarity (e.g., based on a determined score for each sample), e.g., as shown in the example screenshot of FIG. 5, discussed above.

Figure 8:
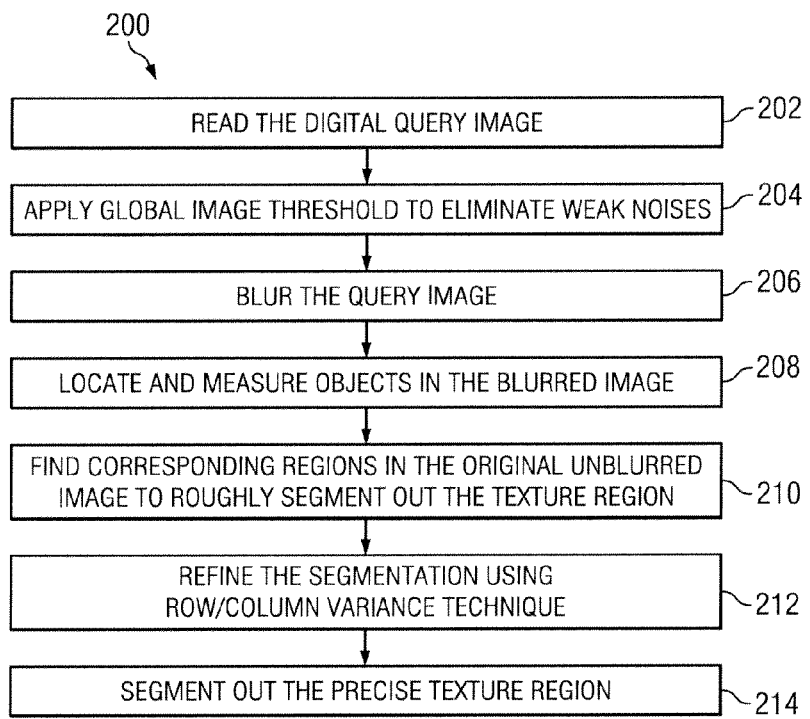
FIG. 8 is a flowchart illustrating an example method for automatically detecting and segmenting out a texture region from a query image, according to an example embodiment.

FIG. 8 is a flowchart illustrating an example method 200 for automatically detecting and segmenting out a texture region 150 (e.g., a transferred ink image or photograph image) from a query image 24 for analysis, e.g., with reference to step 122 and FIG. 7 discussed above.

At step 202, siding analysis engine 14 may read the digital query image 24. At step 204, engine 14 may apply a global image threshold using Otsu's method (or any other suitable method) to eliminate weak noises. At step 206, engine 14 may blur the image severely. For example, engine 14 may resize the image to 1/64 scale. At step 208, engine 14 may automatically locate the objects in the blurred image and measure the size of the objects, using any suitable techniques. At step 210, engine 14 may keep relatively large objects in the blurred image and find the corresponding regions in the original unblurred image. In this step the texture region 150 is roughly segment out.

At step 212, engine 14 may refine the segmentation using a variance of each row or column. For each row or column containing the texture region 150, the variance should be large. Engine 14 may detect the boundary of the texture region 150 precisely by cutting out the columns and rows using a smaller variance, or using any other suitable technique. Engine 214 may then segment out the precise texture region 150 at step 214.

Digital Query Images 24

As discussed above, digital image generator 12 may generate one or more digital query images 24 of a siding sample 20 or a siding sample representation 22, which digital query images 24 may then be analyzed by siding analysis engine 14. Digital query images 24 may comprise any suitable image of a siding sample 20 or siding sample representation 22 generated in any suitable manner. For example, as discussed below, digital query images 24 may include:

(a) a digitized (e.g., scanned or digitally photographed) image of an "transferred ink image" transferred from a siding sample to paper, tape, or other substrate, (b) a digitized (e.g., scanned or digitally photographed) image of a chalk transfer from a siding sample to paper, tape, or other substrate, (c) a direct digital photograph of a siding sample 20 (e.g., using a digital camera, smart phone, etc.), with or without an ink or other contrast-enhancing substance applied to the siding sample 20, (d) a digitized (e.g., scanned or digitally photographed) image of a non-digital photograph (e.g., using a Polaroid-type camera) of a siding sample 20, with or without an ink or other contrast-enhancing substance applied to the siding sample 20, (e) a digital video (e.g., to capture a panoramic area) of a siding sample 20, with or without an ink or other contrast-enhancing substance applied to the siding sample 20, (f) a direct digital scan of a siding sample 20 (e.g., using a handheld scanning device), with or without an ink or other contrast-enhancing substance applied to the siding sample 20, or (g) any other digital images or texture data delineation (e.g., texture mapping data), generated in any other suitable manner.

Figure 9:
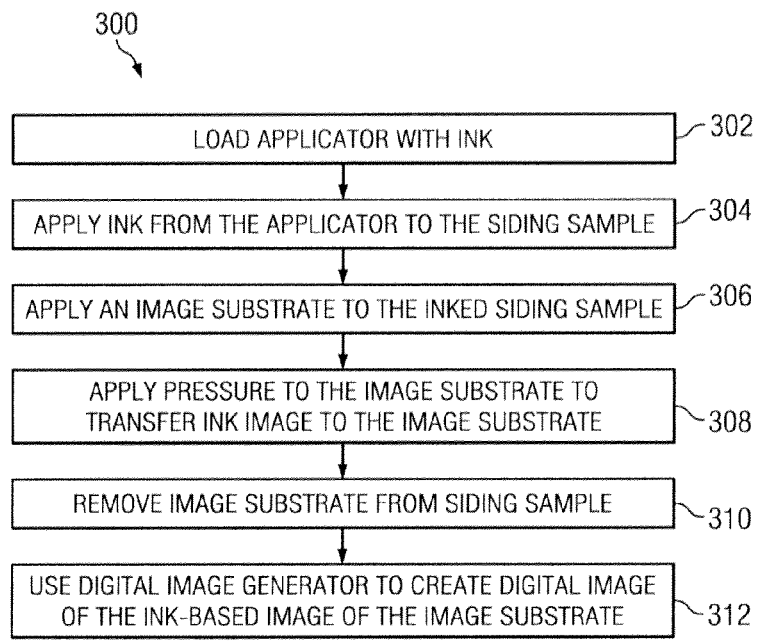
FIG. 9 is a flowchart illustrating an example method for generating a "transferred ink image" of a siding sample, according to an example embodiment.

In some embodiments, a digital query image 24 is created by digitizing (e.g., scanning or digitally photographing) a transferred ink image 22 of a siding sample. FIG. 9 is a flowchart illustrating an example method 300 for generating a "transferred ink image" 22 of a query siding sample, e.g., which may then be digitized by digital image generator 12 and analyzed by siding analysis engine 14 to identify the query siding sample, e.g., using any of the techniques discussed above, according to an example embodiment.

At step 302, a user may load an applicator with ink. As used herein, the term "ink" includes any ink, dye, paint, paste, pigmented substance, or other substance suitable for applying to a siding sample and transferring from the siding sample to an image substrate, to create an image of the siding sample (e.g., indicating contours or other textural features) on the image substrate. As used herein, the term "image substrate" includes paper, cardstock, tape, film (e.g., plastic film), or any other object suitable for receiving a transfer of ink from a siding sample to the image substrate, to create an image of the siding sample (e.g., indicating contours or other textural features) on the image substrate. The applicator may include any device suitable for applying ink to a siding sample, e.g., a roller, brayer, brush, pad, foam block, spraying device, or other suitable ink application device.

Figure 10:
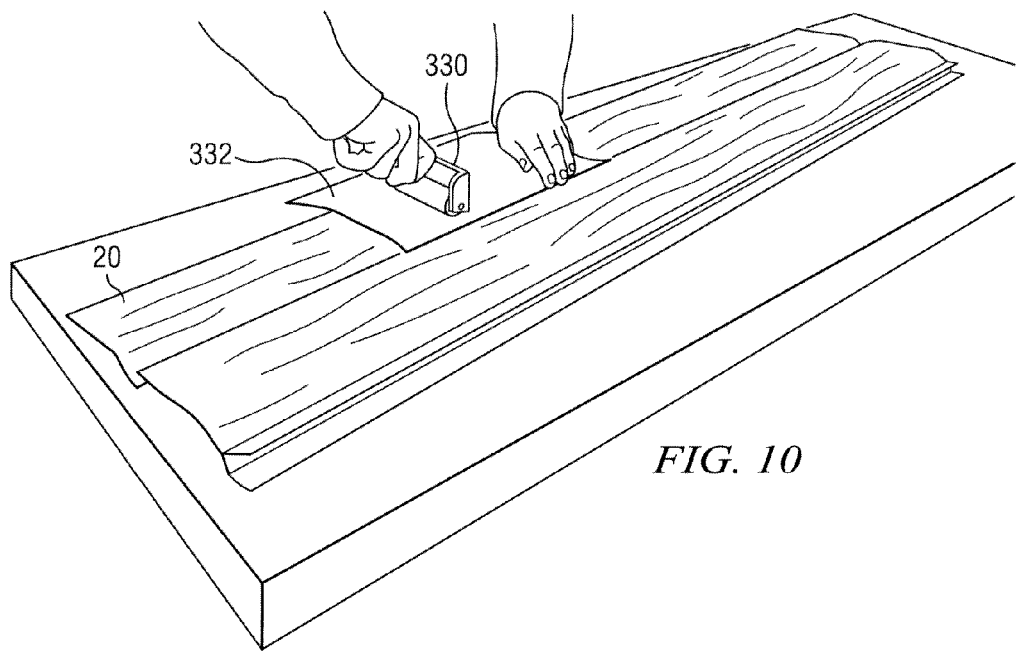
FIG. 10 illustrate an example of a user using a pressing device to press an image substrate against an ink-covered siding sample, to create a transferred ink image on the image substrate, according to an example embodiment.

At step 304, the user may apply the ink from the applicator onto the surface of a siding sample in any suitable manner, e.g., by rolling, painting, brushing, spraying, for example. At step 306, the user may apply the image substrate to the inked siding sample. The user may align the image substrate with a reference point or reference line, e.g., the top lock or butt of the siding sample. At step 308, the user may apply pressure to the image substrate to transfer an ink image (e.g., indicating contours or other textural features) from the siding sample to the image substrate, e.g., by pressing by hand or using a pressing device. FIG. 10 illustrate an example of a user using a pressing device 330 to press an image substrate 332 (in this example, paper) against an ink-covered siding sample 20, thereby transferring an ink image from the siding sample 20 to the image substrate 332 (i.e., generating a "transferred ink image").

Figure 11:
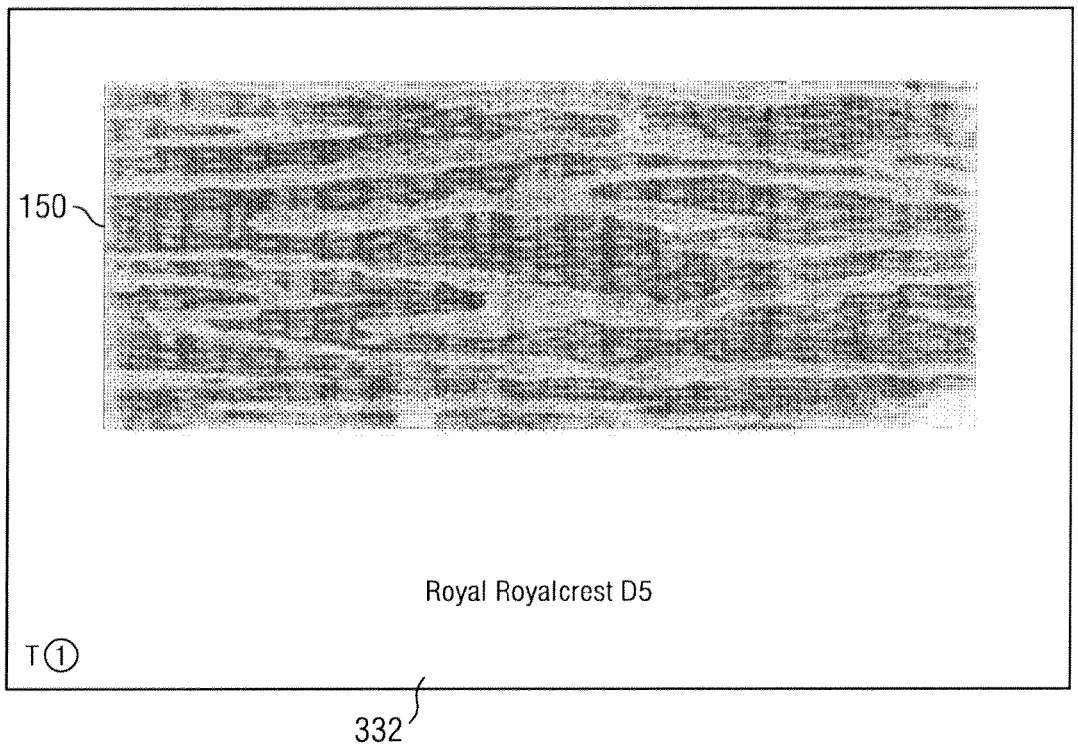
FIG. 11 illustrate an example transferred ink image on an image substrate, according to an example embodiment.

At step 310, the user may carefully remove the image substrate 332 from the siding sample. FIG. 11 illustrate an example transferred ink image 150 on image substrate 332 resulting from the process discussed above. At step 312, the user may then use digital image generator 12 (e.g., a scanner or camera) to create a digital image 24 of the transferred ink image. The digital image 24 may then be loaded or communicated to siding analysis engine 14 for analysis, as discussed above.

Figure 12A:
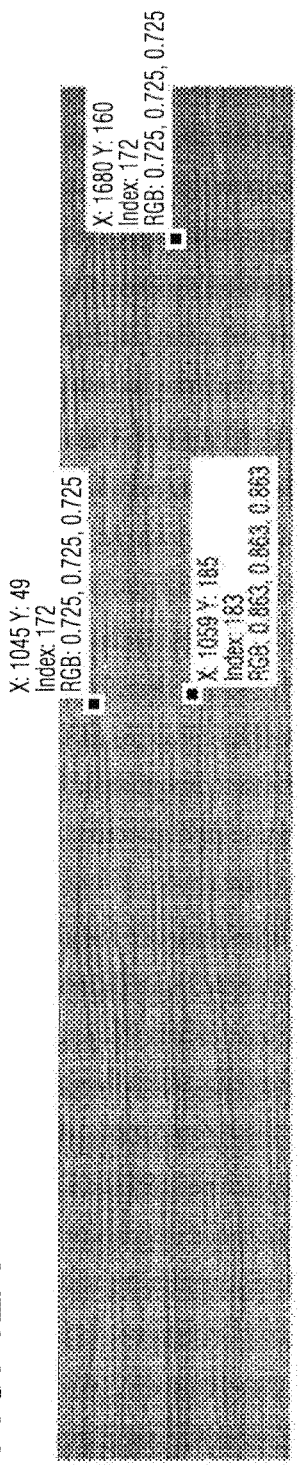
FIGS. 12A and 12B illustrate an example of an original photographic image of a siding sample and a contrast-enhanced version of the image, respectively, according to an example embodiment.
Figure 12B:
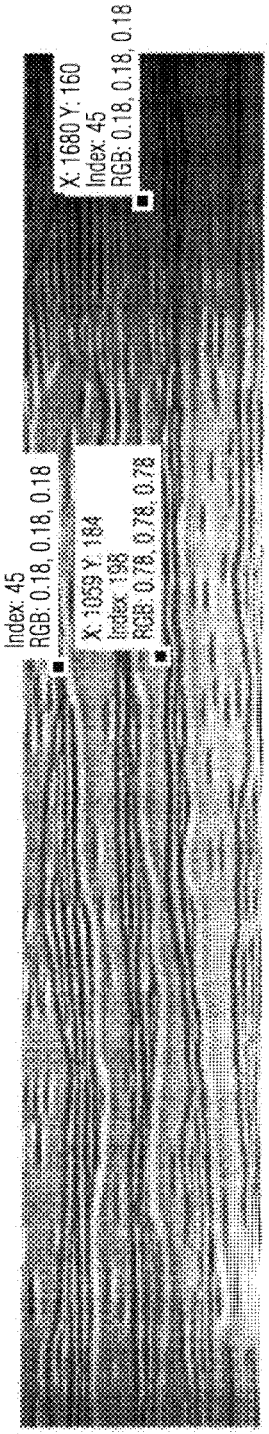

In some embodiments, the contrast of the siding texture in a digital query image 24 may be enhanced using any suitable image processing technique. FIGS. 12A and 12B illustrate an example of an original photographic image of a siding sample and a contrast-enhanced version of the image, respectively.

In some embodiments, multiple digital images 60 (e.g., multiple images or multiple of a siding sample or multiple images of a siding sample representation) may be generated and stored for particular reference siding samples 52. For example, certain types of siding (e.g., certain vinyl siding) are manufactured with a pattern that repeats ever 18", 30", etc. For such siding, a set of digital images 60 that capture different areas of the repeating pattern may be generated and stored, such that a set of images 60 that covers the entire pattern (e.g., extending a full 18", 30", etc.). Thus, a query image 24 may be compared against the sets of images 60 corresponding to such reference siding samples 52, which may increase the accuracy of the pattern recognition analysis.

Thus, it should be understood from the discussion above that in some embodiments or situations, where a particular siding sample to be identified is still attached to a structure (e.g., a house or other building), the siding sample may be analyzed without removing the siding sample from the structure. This may provide various advantages as would be known in the industry.

Although the disclosed embodiments are described in detail in the present disclosure, it should be understood that various changes, substitutions and alterations can be made to the embodiments without departing from their spirit and scope.

What is claimed is:

1. A method for identifying siding, comprising:
   receiving particular texture data associated with a physical texture of a particular siding sample;
   receiving via user input siding characteristic data of the particular siding sample;
   cropping the particular texture data into a plurality of patches;
   extracting quantified visual features from each individual patch of the plurality of patches;
   accessing a reference database including, for each of multiple different reference siding samples, both (a) reference quantified visual features associated with a physical texture of the respective reference siding sample and (b) reference siding characteristic data for the respective reference siding sample;
   for each individual patch, performing an automated texture data analysis by comparing the quantified visual features extracted from the respective individual patch with the reference quantified visual features associated with different reference siding samples;
   performing an automated comparison of the user-input siding characteristic data of the particular siding sample with the reference siding characteristic data associated with different reference siding samples; and
   automatically identifying at least one reference siding sample that matches the particular siding sample based at least on (a) the automated texture data analysis of each individual patch and (b) the automated siding characteristic data comparison.

2. A method according to claim wherein the siding characteristic data of the particular siding sample includes at least one of siding material, siding style, a siding face size characteristic, a siding profile characteristic, and siding manufacturer.

3. A method according to claim 1, further comprising displaying on a display device an indication of the at least one matching reference siding sample identified as matching the particular siding sample.

4. A method according to claim 1, wherein the particular texture data associated with the physical texture of the particular siding sample comprises a digital image.

5. A method according to claim 4, wherein the digital image comprises a photographic or scanned image of the particular siding sample having ink applied thereto.

6. A method according to claim 1, wherein the particular texture data associated with the physical texture of the particular siding sample comprises digital data representative of the physical texture of the particular siding sample.

7. A method according to claim 4, wherein the digital image comprises a photographic image of the particular siding sample.

8. A method according to claim 4, wherein the digital image comprises a scanned image of the particular siding sample.

9. A method according to claim 4, wherein the digital image comprises a digital image of a transferred ink image of the particular siding sample.

10. A method according to claim 9, wherein the transferred ink image of the particular siding sample is produced on an image substrate by applying ink to the particular siding sample and applying the image substrate to the inked particular siding sample to transfer an ink image from the particular siding sample to the image substrate.

11. A method according to claim 1, further comprising:
    generating a transferred ink image of the particular siding sample by applying ink to the particular siding sample and applying an image substrate to the inked particular siding sample to transfer an ink image from the particular siding sample to the image substrate; and
    generating a digital image of transferred ink image.

12. A method according to claim 1, wherein automatically identifying at least one reference siding sample that matches the particular siding sample comprises:
    determining a similarity score for each of a plurality of reference siding samples, wherein the similarity score indicates a level of similarity; and
    identifying at least one reference siding sample that matches the particular siding sample based on the respective similarity scores of the plurality of reference siding samples.

13. A method according to claim 12, wherein identifying at least one reference siding sample that matches the particular siding sample comprises identifying each reference siding sample having a respective similarity score that exceeds a predefined threshold score.

14. A method according to claim 12, wherein identifying at least one reference siding sample that matches the particular siding sample comprises identifying N reference siding samples having the highest similarity scores, where N is a predefined number.

15. A method for identifying siding, comprising:
    generating a transferred ink image of a siding sample by applying ink to the siding sample and applying an image substrate to the inked siding sample to transfer the ink from the siding sample to the image substrate;
    digitizing the transferred ink image;

cropping the digitized transferred ink image into a plurality of patches;
extracting quantified visual features from each individual patch of the plurality of patches;
analyzing each individual patch by comparing the quantified visual features extracted from each individual watch with reference quantified visual features associated with different reference siding samples;
receiving via user input siding characteristic data of the siding sample;
performing an automated comparison of the user-input siding characteristic data of the siding sample with the reference siding characteristic data including reference quantified visual features associated with different reference siding samples; and
automatically identifying from a plurality of reference siding samples at least one reference siding sample that matches the siding sample based at least on (a) the analysis of each individual patch of the cropped digitized transferred ink image and (b) the automated siding characteristic data comparison.

16. A system for identifying siding, comprising:
a processor;
a non-transitory storage medium;
a display device; and
a set of computer readable instructions stored in the non-transitory storage medium and when executed by the processor configured to:
receive particular texture data associated with a physical texture of a particular siding sample;
crop the particular texture data into a plurality of patches;
extract quantified visual features from each individual patch of the plurality of patches;
access a reference database including, for each of multiple different reference siding samples, reference quantified visual features associated with a physical texture of the respective reference siding sample;
for each individual patch, perform an automated texture data analysis by comparing the extracted quantified visual features from the respective individual patch with the reference quantified visual features associated with different reference siding samples;
receive via user input siding characteristic data of the particular siding sample;
performing an automated comparison of the user-input siding characteristic data of the siding sample with stored reference siding characteristic data associated with different reference siding samples; and
based at least on (a) the automated texture data analysis of each individual patch and (b) the automated siding characteristic data comparison, identify at least one of the reference siding samples as a matching reference siding sample that matches the particular siding sample; and
cause an indication of the at least one matching reference siding samples to be displayed on the display device.

17. A system for identifying siding, comprising:
a digital image generating device programmed to digitize a transferred ink image of a particular siding sample, the transferred ink image being generated by applying ink to the particular siding sample and applying an image substrate to the inked particular siding sample to transfer an ink image from the particular siding sample to the image substrate; and
a siding analysis engine comprising a processor and a set of computer readable instructions stored in non-transitory storage media and executable by the processor to:
crop the particular texture data into a plurality of patches;
extract quantified visual features from each individual patch of the plurality of patches;
analyze each individual patch by comparing the quantified visual features extracted from each individual patch with reference quantified visual features associated with a plurality of different reference siding samples;
receive via user input siding characteristic data of the siding sample;
perform an automated comparison of the user-input siding characteristic data of the siding sample with stored reference siding characteristic data associated with different reference siding samples; and
identify from a plurality of reference siding samples at least one reference siding sample that matches the siding sample based at least on (a) the analysis of the extracted quantified visual features of each individual patch and (b) the automated siding characteristic data comparison.

* * * * *